Figure 5:
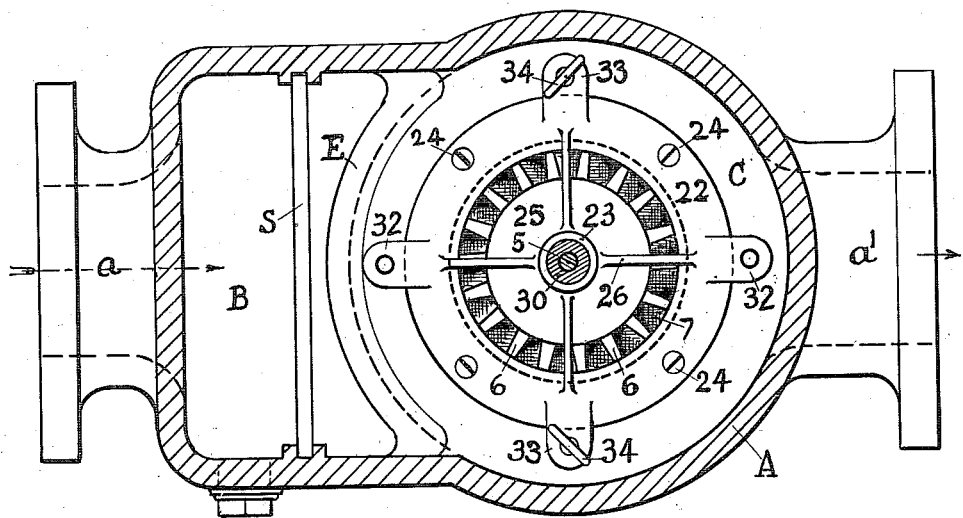

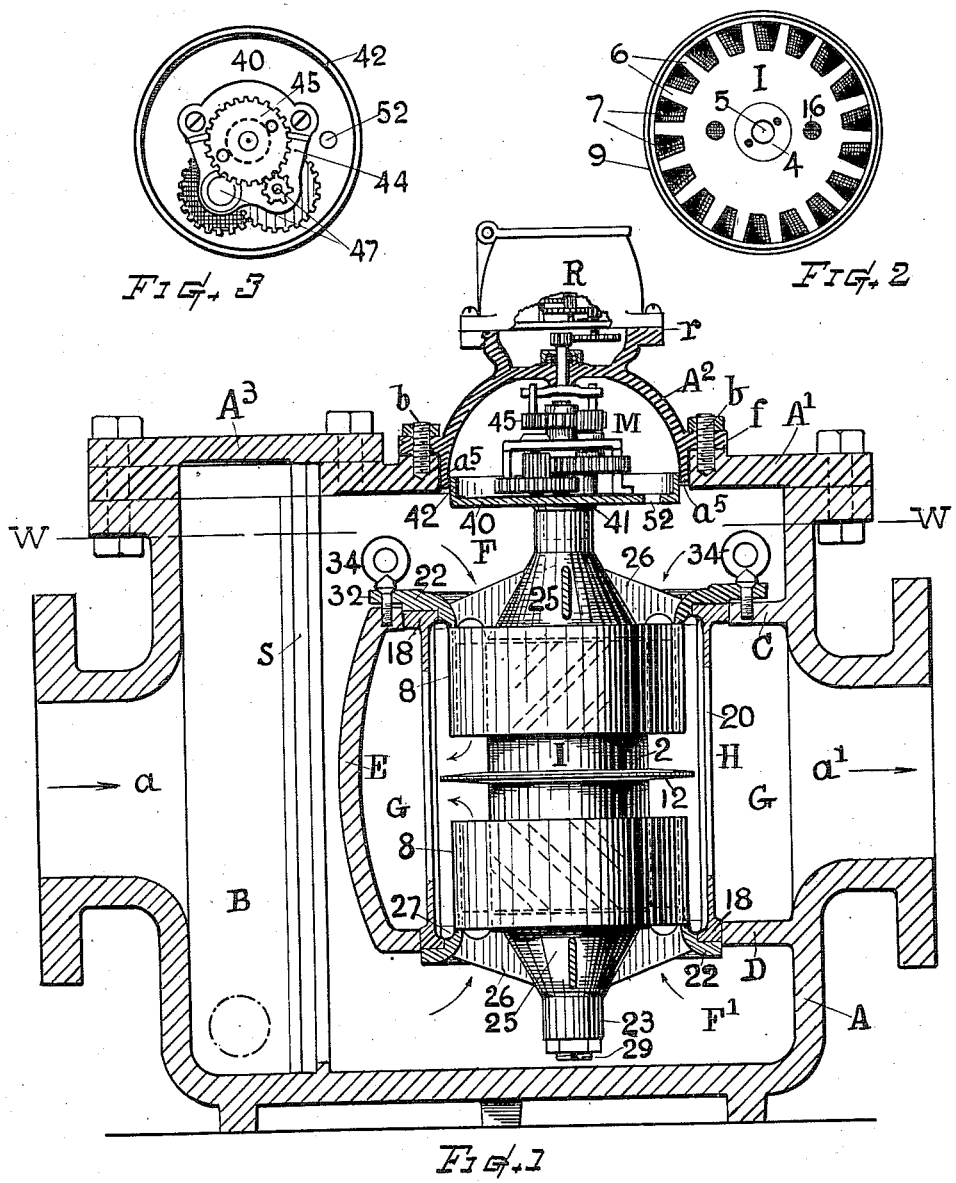

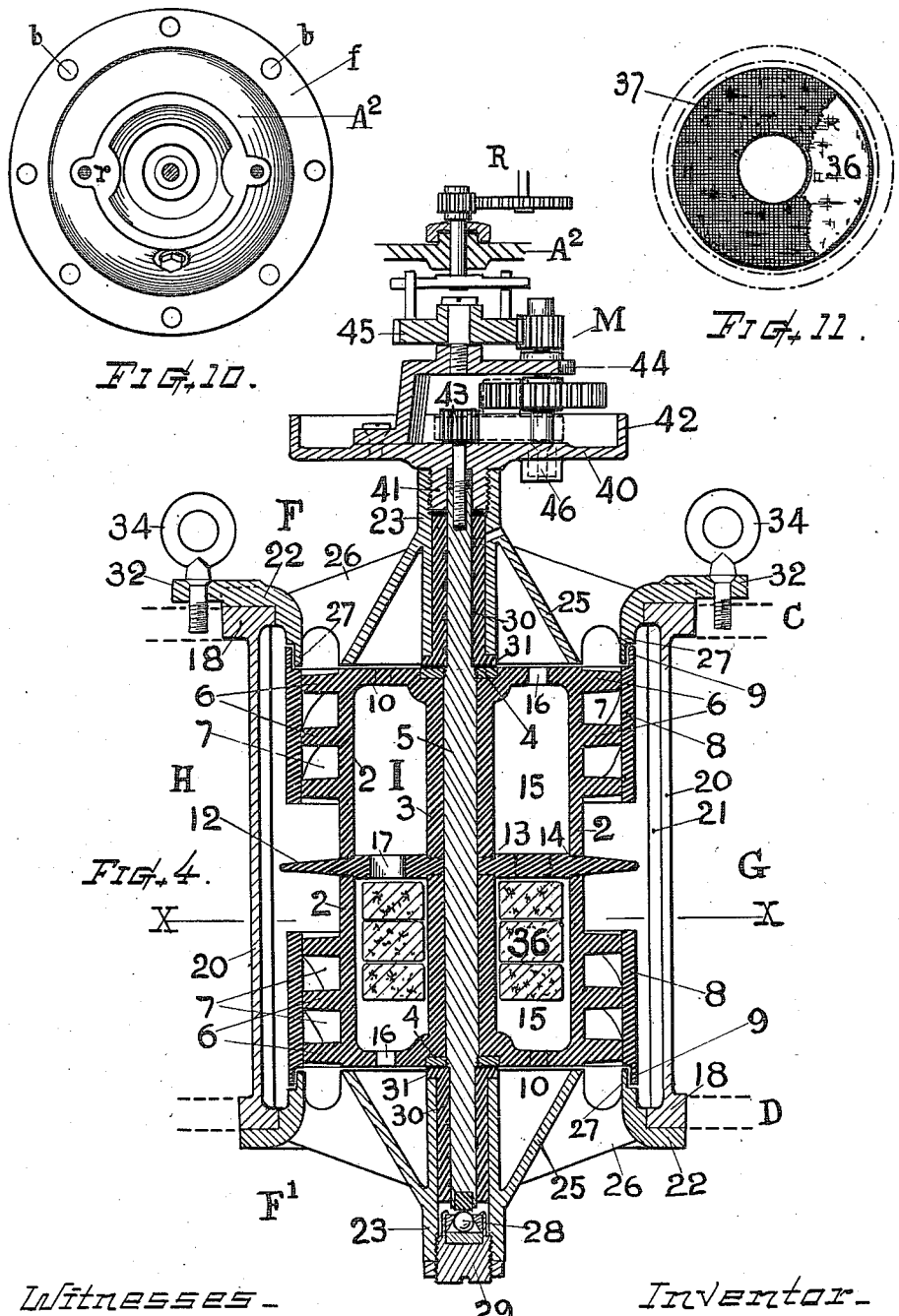

W. H. LARRABEE.
WATER METER.
APPLICATION FILED NOV. 11, 1908.

979,518.

Patented Dec. 27, 1910.
3 SHEETS—SHEET 3.

Witnesses.
Ella P. Blenus
Frank O. Woodland

Inventor.
William H. Larrabee
By Chas. H. Burleigh
Attorney

UNITED STATES PATENT OFFICE.

WILLIAM H. LARRABEE, OF WORCESTER, MASSACHUSETTS, ASSIGNOR TO UNION WATER METER COMPANY, OF WORCESTER, MASSACHUSETTS, A CORPORATION OF MASSACHUSETTS.

WATER-METER.

979,518.   Specification of Letters Patent.   Patented Dec. 27, 1910.

Application filed November 11, 1908. Serial No. 462,022.

*To all whom it may concern:*

Be it known that I, WILLIAM H. LARRABEE, a citizen of the United States, residing at Worcester, in the county of Worcester and State of Massachusetts, have invented a new and useful Water-Meter, of which the following is a specification, reference being made therein to the accompanying drawings.

This invention relates to certain novel features of construction and organization of mechanism more especially applicable to that class of meters commonly termed "current meters," and wherein motion is acquired for driving the registering mechanism by the action of the flowing current upon a measuring wheel, whirler or propeller, provided with helically disposed vanes.

The object of my invention is to provide a water meter efficiently adapted for the delivery and measurement of the largest volume of water consistent with the size of the inlet and the head or pressure; and which is also sufficiently sensitive to detect and measure a small flow of water under low rate; also to measure any volume of stream, within a reasonable range of accuracy, from the highest to the lowest rate of flowage through the meter.

Another object is to provide a meter of the class named with a wheel or measuring element that can be easily and conveniently manufactured; (comprising its own cylinder) and which will run in true balance and free from vertical or side thrust when in action; said meter-wheel being of a structure that can be made heavy or light in weight, as may be required, without varying its working dimensions, and which is compact, strong and capable of withstanding the ordinary, or extraordinary strains caused by unequal pressures in the pipes, which may occur from water-hammer, or other causes.

Another object is to combine the working parts of the meter, comprising the meter-wheel, its bearing-cage, gear-support, and intermediate gearing as a structural unit, so that all such working parts can be together conveniently taken from or replaced in the meter casing at the same time, or as a single piece, for repairs or otherwise, and without necessitating the disconnecting of the meter from the pipe line.

Another object is the construction of an intermediate gearing train in a manner that will afford a light, strong, durable and practically frictionless gear mechanism comparatively inexpensive and easy for manufacture and assembling; and to provide a means of support for the intermediate gear train, unattached to the cover of the meter, but in combination with the cage or bearing-head which supports the meter-wheel axle; and having central attachment therewith and readily detachable therefrom; also, to provide protection for said gearing from the direct flow of water and accumulation of sediment, while amply supplied with water for lubrication.

Minor objects and features of my invention are more fully set forth and explained in the following detailed description, the particular subject matter claimed being definitely specified in the summary.

The accompanying three sheets of drawings illustrate an embodiment of my invention in practical form.

Figures 6, 7, 8, 9:
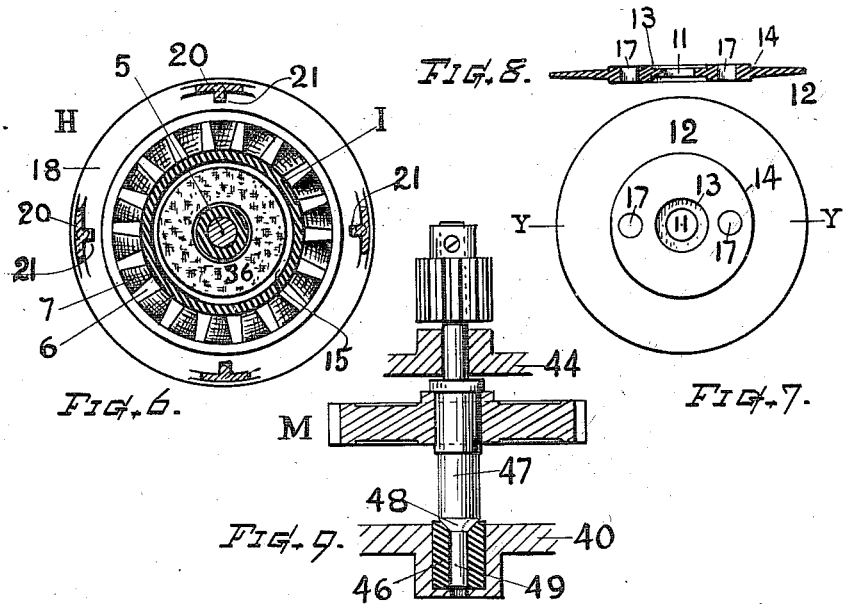

Figure 1 represents a longitudinal vertical section through the meter casing, with the propeller or meter-wheel shown therein in side view. Fig. 2 is a separate top end view of the meter-wheel. Fig. 3 is a plan view of the intermediate gearing and its supporting disk. Fig. 4 is a vertical central section of the meter-wheel, its cage and the supporter for the intermediate gearing. Fig. 5 is a horizontal section below the cover at line W W on Fig. 1. Fig. 6 is a horizontal section of the meter-wheel and cage at line X X on Fig. 4. Fig. 7 is a separate plan view of the central flange member or deflector plate. Fig. 8 is a transverse section of the same at line Y Y on Fig. 7. Fig. 9 is a sectional view showing one of the intermediate gear-axles. Fig. 10 is a separate top plan of the dome-shaped member of the casing, and Fig. 11 is a plan of a buoyant disk for the interior of the meter-wheel.

Referring to the drawings, A indicates the main body of the meter-casing, provided with inlet spud $a$ and outlet spud $a^1$ suitably formed for attachment to the service pipes; $A^1$ the cover or top-plate fitting upon and covering the whole meter and secured to the body by suitable bolts; $A^2$ a dome or upwardly arched member seated upon and secured to the top-plate directly over the metering mechanism; said cover plate being provided with a circular opening therein of sufficient size to afford space for the intermediate gear train beneath said dome; and $A^3$ is the rectangular supplemental cover over the sediment chamber B, to afford access to the screen.

The main casing and cover may be cast of iron, but the dome is preferably made of bronze. It is provided with an annular supporting flange $f$ that fits upon a suitable seat formed upon the cover-plate about the opening therein; and with a circular bottom-rim $a^5$ below the seat-flange, and which extends downward within the opening. The dome serves to close the opening and to form a chamber for the intermediate gearing. Its upper part is provided with an upwardly projecting flange having thereon a suitable seat $r$ for supporting the registering mechanism and its casing R. This dome is secured to the casing by uniformly spaced fastenings $b$ and disposed in such manner that it can be readily assembled upon the meter with either side in front; and by simply changing its relations in respect to the fastening bolts the dome and register can be brought into position for the proper reading of the register, regardless of the situation or position in which the meter is set up for service and connected to the pipes.

The body casing is internally divided, as shown, by two horizontal partitions C and D connected to each other by a curved partition E, all cast integral with the body, and separating the interior into upper and lower inflow chambers or compartments F and $F^1$, communicating through the chamber B with the inlet spud $a$, and of sufficient size for the ample inflow of water; and an outflow chamber or compartment G in direct communication with the outlet spud $a^1$, and affording a horizontally circular space within which the working mechanism is located approximately concentric to the body casing. Each of the horizontal partitions has a circular opening therethrough for receiving the inner casing or cage, within which the propeller or meter-wheel is mounted. The edges of the openings are preferably tapered; the one in the lower partition being somewhat smaller than the one in the upper partition. The two openings are best turned or bored out with a corresponding taper. The boring out of these openings being practically the only machine tool work required on the interior of the body, the labor therefor is very slight, and the cost of manufacture is correspondingly reduced.

S indicates the position of the screen, which extends from the bottom to the top of the casing for preventing the passage of substances liable to choke the meter mechanism. The screen may be of any approved construction.

The meter-wheel or propeller I (sometimes called the piston) is preferably of hard rubber, or other suitable non-metallic substance, and in accordance with my invention is made of the peculiar construction shown. It consists of a hollow cylindrical body 2 having a central hub 3 mounted upon an axis-shaft or spindle 5 whereon it is secured by nuts 4 threaded upon the shaft and preferably let into the heads of the cylinder approximately flush with the surfaces; while the upper and lower ends of the shaft project for a sufficient distance to form journals for supporting the wheel.

Near the respective ends of the meter-wheel the body cylinder is provided externally with a series of helical vanes 6 with water-way passages 7 between them. The pitch or helical inclination of these vanes may be any suitable or desired degree, and the helical trend of the vanes at the upper end of the wheel is in opposite direction to those at the lower end; one being right-hand pitch and the other left-hand pitch, as indicated by dotted lines on Fig. 4. The right-hand pitch may be on the upper portion of the wheel and the left-hand pitch on the lower portion, or vice versa, as in any instance preferred, or according with the direction in which the gearing of the intermediate train is to be rotated. The helical vanes occupy about one third of the length of the wheel, more or less, at each end; leaving about one third, more or less, of the length for outlet space between the upper and lower series. Each set of these helical vanes and water-ways is surrounded by an outer cylindrical shell 8 fitted tightly thereon and terminating at its inner end approximately even with the ends of the vanes 6, and formed at its outer end with a cylindrical rim 9 that projects a short distance beyond the head 10 of the body cylinder. Said rim is preferably reduced on its inner face from the thickness of the cylindrical shell, about one half of the thickness thereof. Midway between the upper and lower helically vaned portions the wheel is provided with a circumferential outwardly projecting deflector plate or flange 12 of suitable thickness, and of a diameter about the same as that of the outer cylinder, more or less. This flange is formed tapering, on both its upper and under surfaces, from the cylinder 2 to its outer peripheral edge, which latter is made as thin as is compatible with the desired or necessary strength. In constructing the wheel the upper and lower vaned sections are preferably formed as separate pieces similar in size, and having the vanes integral thereon; while the outer member 8, which is best made of the same material as the body, is formed as a cylindrical shell of any convenient thickness, permanently fixed to the outer edges of the vanes, thereby properly comprising a part of the wheel section.

The flange-member 12, which may be of the same or other material than the body, is best made as a disk or plate (see Figs. 4, 7 and 8) having a central eye 11 for fitting the shaft 5, and cavities or shoulders 13 and 14 that match the abutting faces of the hub 3 and cylinder 2. This plate is assembled between the oppositely disposed upper and lower wheel sections upon the axis shaft 5, the flat heads 10 being at the top and bottom respectively, and the whole firmly clamped together by the nuts 4, making a complete meter-wheel of the peculiar form shown, practically whole and integral and comprising uniform upper and lower propelling sections and a central deflector flange midway between the exit orifices of the respective series of water-ways. The function of the flange 12 is the separation and radial deflection of the two currents or streams of water passing through the opposite series of water-ways 7 at high velocity. Its use permits of the meter-wheel being made in more compact form and of less length than would be practicable without it.

The meter-wheel is hollow or provided with a large interior chamber, or chambers, 15 for lightness; but is not made water-tight, as the difference between atmospheric pressure inside and the water pressure outside might be liable to crush the thin walls of the wheel; therefore suitable passages are provided, as 16 and 17, to admit water to the interior, and thus maintain equilibrium of pressure upon the inside and outside of the meter-wheel, thus permitting of the walls being made comparatively thin. The meter-wheel is mounted to revolve within an inner casing or structure composed of oppositely disposed bearing-heads and a supporting cage H, or frame therefor, consisting of the upper and lower rings 18 rigidly connected together by upright bars or struts 20 of the proper length and thin sectional area, and having ample unobstructed space between the bars. The internal diameter of the cage rings is greater than the full diameter of the meter-wheel. The bars 20 are best provided with a projecting rib 21 extending along their inner side the full length of the bar. Said ribs serve for strengthening the bars without using an unnecessary amount of metal therein; and for the further purpose of obstructing the circular flowing of the water as it passes from the meter-wheel. The peripheral edges of the rings 18 are properly turned to fit the openings in the partitions C and D, preferably on a uniform taper that includes both the upper and lower rings. The respective bearing heads each consists of an annular member 22, that is securely fastened to the ring of the cage by screws 24, or otherwise, and a central hub 23 surrounded by a conoidal guide-member 25, united with the annulus 22 by the integrally attached radial arms 26, as shown. The inner edge of the annular member is inclined or rounded so as to present an inward guiding surface; and is provided with a lip 27 that extends within the circumferential rim 9 at the end of the meter-wheel, closely matching the contour thereof, but without touching said rim nor the end of the meter-wheel; the wheel being in all cases freely revoluble. The inner ends of the guide-lips 27 and conoidal members 25 terminate near the ends of the wheel adjacent to the outer and inner circle of the helical vanes and water-ways respectively; said parts forming an annular vortex-guide for directing the flow of water easily and effectively into the water-ways and against the vanes. The vortex-guides at each end of the meter-wheel are of similar form and capacity. The wheel may be assembled either end up upon its shaft, as the end sections thereof are similar in form.

The journal bearing-hub, of any convenient diameter, extends inward nearly to the head of the meter-wheel and outward for some distance beyond its conoidal guide-member. The hub has a concentrically bored hole through its entire length; the outer portion being internally screw-threaded, while within the remaining portion of the hub there is provided a tubular bushing 30, of hard rubber or other suitable material, forming the bearing in which the bronze axis shaft 5 of the meter-wheel is journaled to properly rotate. The bushing is best provided with a flange 31 at its inner end adjacent to the flat surface of the bronze collar or nut 4 which fastens the wheel to the shaft, and forms an upward thrust-bearing for the meter-wheel, should said wheel from any cause be uplifted, which would rarely if ever occur. The hard rubber bushing 30 for the upper wheel journal, is preferably made to have a free running fit within the bearing-hub 23, as I have found that if the upper bushing runs loose in its hub as well as the journal running loose in the bushing, while the lower bushing is tight in its hub, then the meter-wheel revolves with greater freedom of movement than would be the case where both bushings are tight in the metal bearing-hubs. This is more noticeable when the parts are running in water. It may in some instances be desirable to have this upper bushing made tight in its bearing-hub, therefore I do not wish to confine my invention in practice to the use of loose bushings, but may use tight or loose bushings as occasion may require. A spiral groove may be formed around the central hole of the bushings for the lubrication of the shaft, means being provided for the admission of water into said grooves.

A suitable step-bearing 28 is provided for the lower end of the meter-wheel shaft, said bearing being carried upon a supporting plug 29 screwed into or otherwise secured in the end of the lower bearing hub. The particular features and construction of the step-bearing, for this purpose, is made the subject of separate application for Letters Patent, Serial No. 462,023, of even date herewith.

The upper bearing-head is provided with projecting ears 32 and 33 that extend over the partition C, and the assembled parts of the meter mechanism are secured within the casing by eye-bolts 34 that pass through the ears 32 and screw into threaded holes in the partition. The ears 33 have threaded holes therein into which the same eye-bolts 34 can be screwed, after their removal from the ears 32, and used for forcing the inner casing or cage from its tapered seat by the impingement of the ends of said eye-bolts against the surface of the partition, when it is desired to remove the working parts from the main casing, and for lifting said parts out of said casing. In Fig. 5 the eye-bolts are shown at positions for forcing the inner casing from its seat.

In meters of this type it is important that the meter-wheel be made as light as possible, so that the power required for overcoming the inertia and starting the meter may be the least possible amount; and also to reduce the friction upon the step-bearing, thus increasing the sensitiveness of the meter correspondingly; and furthermore, the momentum of a light meter-wheel is much less than that of a heavy one and therefore gives a more uniform rate of registration.

While the specific gravity of hard rubber, of which the pistons, propellers or meter-wheels of water meters are usually made, is but slightly greater than that of water, the bronze shaft 5, upon which the hard rubber parts are mounted, renders the average specific gravity of the entire meter-wheel somewhat more, rendering its weight greater than may be desired. So far as I am aware such weight has never been successfully overcome by any means heretofore employed in water-meters. By my invention the weight of the wheel or metering element is reduced to a negligible quantity for eliminating friction upon the step-bearing, and rendering the mechanism practically free from the tendency for racing or running forward by the momentum and over-registering as the flow of water is suddenly reduced or shut off. For overcoming the excess of gravity in a meter-mechanism I provide within the wheel specially prepared pieces of cork 36, or equivalent substance, of less specific gravity than water and of any predetermined size or dimension, according to the amount of weight to be overcome. These pieces of cork, or equivalent substance, are best formed as annular disks or rings of suitable thickness and of a diameter that will conveniently lie within the annular chamber 15 between the cylinder 2 and hub 3; care being taken to leave sufficient water space about the cork to maintain equilibrium of pressure within the wheel. One, two or more disks 36 can be employed as may be found more desirable in any instance, said prepared cork can be introduced within the chamber of the upper or lower wheel sections, or both, when assembling the parts of the wheel upon its axle-shaft. The cork is prepared with a surface coating of vulcanized rubber thereon, or by other suitable material 37, so that while its specific gravity is not materially changed, it will not absorb water when under pressure, and will maintain its buoyancy for an indefinite period. The buoyancy of the cork is such that when confined within the interior of the meter-wheel it will lift the same any desired amount according to the bulk of the inclosed cork body; thus relieving the weight upon the step-bearing, and reducing the wear and friction on the parts. By thus lightening the meter-wheel it will start easily and will respond to very light streams of water, permitting the use of larger water passages, and increasing the capacity. This feature of employing cork prepared with a coating or exterior surfacing of rubber or water repellent substance, for rendering the wheel light running, may be applied to meter-wheels of other form than that herein shown. It is possible, with the construction of meter here shown, to measure a stream of the full capacity of the spuds, or a flowage representing a stream one thousand times smaller. This is considered a reasonable range of efficiency.

M indicates the intermediate gear train, for supporting which I provide a circular plate 40 having, upon its under side, a threaded central boss 41 that is connected with the threaded top-end of the upper bearing 23, and is wholly supported thereby. This plate is best provided with an upward peripheral rim or flange 42 that approximately fits in conjunction with the bottom edge or flange $a^5$ of the dome $A^2$, but is not connected therewith. The spindle of the first gear or pinion 43 passes through and is journaled in the boss 41 and has its lower end connected, by screw-thread or otherwise, with the top end of the meter-wheel shaft for the transmission of motion to the gear train. The intermediate gears are preferably made of hard rubber, which from long experience has been found to be the most satisfactory material when run in water in conjunction with bronze pinions. The top gear 45, which runs upon a center-stud, is provided with two pins or lugs for actuating the crank or cross-bar that drives the registering mechanism, in well known manner. The registering mechanism (not shown in detail herein) can be of any approved kind and is inclosed in the casing R at the top of the dome.

A plate 44 for the top-bearings is supported upon the circular plate 40, by a suitable leg bracket, or downwardly reaching member and suitable bosses are formed on said plate and drilled in proper places for the reception of the special hard rubber bushings that form the bearings for the gear spindles 47. Upon the plate 40 are correspondingly disposed bosses containing hard rubber bushings 46 in which the lower ends of the gear-spindles are supported. Each of these lower bushings (see Fig. 9) is drilled clear through with an opening of reduced size, and its upper end counter-bored on an angle of forty five degrees, more or less; such counter-bore forming the seat or step on which the gear spindle 47 runs; said spindle having a conoidal portion 48 of similar degree of inclination, and a reduced extended end 49 that fits and freely rotates in the straight bore within the bushing. By this construction I produce a bearing that will run freely and smoothly, and with but little friction. The conoidal shape of the bearing shoulder tends to prevent gritty substances, found in all water to a more or less extent, from getting in and cutting the bearing surfaces; while the spindles are caused to maintain their central relation and not wear to an irregular form. The circular plate 40 is sufficiently high above the annular plate not to obstruct the flow of water to the meter-wheel, while it fills the base of the dome and efficiently protects the intermediate gearing from the flowing currents, or the access to the gearing of any substances that might clog the gears. A small opening 52 through the plate permits the passage of sufficient water into the gear chamber to keep the gears and spindle bearings thoroughly lubricated, or to drain out of the chamber when the supply to the meter is shut off.

By constructing and combining the intermediate gear-supporting devices with a central attachment to the meter-wheel bearing, and a circular plate as set forth, the working parts are all assembled as a unitary structure, and can be together all taken out of the main casing or replaced therein as a single piece, when the cover A¹ has been removed. This is of considerable utility when manufacturing the meters, or when making repairs, as it permits of the works being removed from the main casing while leaving the latter attached to the service pipes.

It is oftentimes very inconvenient to remove a meter from the pipe line; but with this construction, should repairs be necessary to the working parts, or should it be desired to remove them for any cause, all that need be done would be to remove the cover, lift out the whole interior works, replacing the same by new works and put on the cover, thus avoiding all delay and bother; or the cover could be put on and the water run through the body of the meter without any interior works until such time as it may be convenient to replace the parts taken out for repairs. In either case there would be a saving of much time and trouble. The gear support can also be readily detached from and attached to the bearing hub, and will always stand in proper axial alinement therewith; while the intermediate train is firmly and securely held in place and avoids the use of numerous fastening screws with the liability of their heads being eaten off by corrosive action of the water. Also the construction is simple, inexpensive and convenient for manufacture.

The operation of the meter is as follows: The water entering the inlet spud $a$ passes into the upper and lower compartments F and F¹ in approximately equal volumes; thence downward and upward through the respective vortex guides and annular series of water-ways 7; the oppositely directed currents impinging upon the helical vanes 6, between the body cylinder 2 and the surrounding cylindrical shells 8; thereby causing the meter-wheel to revolve with greater or less rapidity according to the quantity of water passing through; the oppositely discharged currents being separately deflected radially outward in all directions by the annular flange 12 into the compartment 6, from whence it passes out through the outlet spud $a^1$.

It will be noticed that by making the meter-wheel with uniform upper and lower end-feeding series of vanes, and the intermediate deflecting flange, and by presenting the inflow of water at the upper and lower ends of the wheel in equal volume and pressures, there will be no dynamic thrust, and what little weight the meter-wheel and its bronze shaft may have in water, is overcome or taken care of by the specially prepared cork disks 36 within the wheel, thus leaving no weight to be borne by the step or ball bearing; thereby rendering the meter-wheel exceedingly sensitive and capable of rotation by the smallest stream of water that it may be called upon to measure.

I claim—

1. In a water meter, a meter-wheel or propeller, consisting of a cylindrical body having near its respective ends similar oppositely disposed series of projecting helical vanes with water-ways between, each series surrounded by an outer cylindrical shell attached thereto, and a circumferential projecting flange around the cylindrical body midway between the respective series of vanes; in combination with wheel-supporting means having guide passages for directing currents of water downward and upward onto the respective series of vanes, at the upper and lower ends of the wheel.

2. In a water-meter, a meter-wheel or propeller, comprising an internally chambered body cylinder having a central hub and axis shaft, and provided externally with an upper and lower series of projecting oppositely inclined helical vanes, and water ways, each series of vanes surrounded by a cylindrical shell attached thereto and terminating with a projecting circular rim at the ends of the wheel, and a circumferential deflector around said body cylinder intermediate the series of vanes; in combination with the meter casing, an inner open-sided cage provided with supporting heads having bearings for the axis-shaft, and vortex guides that direct uniform downward and upward water currents to the respective outer ends of the series of vanes.

3. In a water meter, the combination with the main casing having the united upper and lower horizontal partitions, with circular openings therethrough; of the wheel-supporting cage consisting of upper and lower rings united by upright bars, and having the wheel bearing heads secured thereto, said rings fitting in the openings of the respective partitions with tapered joint surfaces, and means for securing said parts within the meter casing.

4. In a current water meter, the combination with a main meter-casing having inlet and outlet spuds thereon, and internal upper and lower partitions with circular openings and cage-supporting seats therein, and a revoluble meter-wheel, of a supporting cage or inner casing for said meter-wheel, removably seated in the openings in said partitions within the main meter-casing, and provided at its respective ends with bearings for the meter-wheel axle, an intermediate gear train, and means for supporting said gear-train connected with said supporting-gear-train connected with said supporting-cage but unattached to the main meter-casing; said meter-wheel, its supporting cage and the gear-train mechanism being together assembled as a unitary structure, and together removable from said main casing.

5. In a meter of the class described, the meter-wheel composed of two similar dimensioned oppositely arranged helically vaned sections of hard rubber or non-metallic substance, a metal axis-shaft whereon said sections are assembled, a peripherally projecting disk or plate interposed between said sections, and nuts threaded upon the shaft at the opposite ends of the wheel sections and confining said parts firmly together; the ends of the shaft projecting as journals.

6. The combination with a meter-wheel having a vertical axis shaft, an annular supporting member having central bearing-hubs in which the meter-wheel-shaft rotates, a train of intermediate register-driving gearing, the gear-carrier frame having a central support connected with the upper bearing hub, and the axle of the primary gear of said train passing through the central connecting member and operatively united to the meter-wheel-shaft.

7. In a water meter of the class described, the combination, with the main casing and its cover, said cover having an opening therethrough, the meter mechanism and intermediate gearing train in alinement therewith, of a removable upwardly arched dome seated and secured upon the exterior of said cover and forming an elevated chamber over said opening for the intermediate train of gearing, an upwardly projecting register-seating flange formed on the top of said dome, and the centrally supported gear-supporting stand having a circular plate that approximately fits the interior of said dome adjacent to the cover, and below said train of gearing.

8. In a water meter, the combination with the main casing, its cover-plate having an opening in alinement with the meter-wheel axis and surrounded by an annular seat, a dome having a supporting flange matching said annular seat; and a circular rim extending downward within the opening, a seat for the registering mechanism and register casing at the top of said dome, the intermediate gear train, its frame having a central support in connection with the meter-wheel axle bearing, and provided with a flanged plate that approximately fits the bottom of the dome.

9. In a water meter, the combination with the main casing, metering mechanism and intermediate gear train; of means for protecting the gear-train, said means comprising an inverted cup-shaped member or bronze dome arranged over and forming a chamber for said gear-train, and an underlying plate having a peripheral edge approximately fitting the opening at the base of said dome below the gear-train, with a small passway for permitting water to fill the chamber.

10. In a water meter, the combination with the main casing, its cover-plate, metering mechanism, and a train of intermediate gear-mechanism operated thereby; of a dome or inclosing member mounted upon said cover-plate over the gear-train, and the registering mechanism and register casing seated and secured upon the dome; said dome being adjustably combined with the cover-plate, and fastening devices therefor that permit of the parts being assembled and secured with the front of the dome and register at different points of the compass in relation to the meter casing.

11. In a water meter of the class described, in combination with the meter casing provided with horizontal upper and lower partitions having circular openings therein, the meter-wheel, and its supporting cage fitting in said openings; of the wheel bearing head provided with projections that extend over the upper partition; a portion of said projections having non-threaded openings and a portion thereof having threaded openings, and eye-bolts adapted to fit the non-threaded openings and screw into the partition for securing the cage in place, and to screw into the threaded openings and impinge against the partition for forcing the cage from its seat.

12. In a water meter of the class specified, the combination, of a meter-wheel revoluble on a vertical axis and having propelling vanes for its actuation by the water currents, said wheel being hollow or internally chambered, and provided with passages for the entrance of water into the chamber; and an inclosed float-member consisting of a floatable body of light material approximately conforming to but of less dimension than the chamber, wherein it is loosely arranged, the entire surface of said floatable body being closely enveloped, about its periphery, sides and inner circle, with a complete unperforated tegument of rubber.

13. In a water meter, a meter-wheel comprising a body-cylinder having a central hub, upper and lower series of helical vanes with water-ways between, an annular internal chamber and a metal axis shaft, including within its chamber an annular buoyant element of prepared cork concentrically disposed around the central hub or axis.

14. In a water meter, a meter-wheel or propeller having a plurality of series of propelling vanes, and provided circumferentially with a projecting deflector-plate or flange for the radial discharge of the flow when it passes from the vanes.

15. In a water meter, a meter-wheel comprising two similar sized oppositely disposed series of vanes and water-ways, arranged concentrically and in alinement with each other, with an annular space between the two series, and adapted for the in-feed of water at the respective ends of the wheel and for discharging oppositely into the annular space between the series; and means for preventing the oppositely-directed currents, issuing from the water-ways, from impinging directly upon each other.

16. In a water meter, a meter-wheel comprising a cylindrical body provided with an upper and lower series of helical vanes and water-ways adapted for the in-feed of water at the opposite ends of said wheel, and an intermediate circumferential deflecting means having outwardly tapered surfaces, against which the helical water-ways respectively discharge.

17. In a water meter, a meter-wheel or propeller comprising two oppositely arranged hollow cylindrical sections, each provided with a series of vanes and water-ways, in combination with an intermediate disk or plate, the edge thereof forming a circumferential flange, the body cylinder of each section extended inward beyond the vanes, and having its circular edge supported against said disk, a circular shoulder or lug formed upon said intermediate disk for sustaining said cylinder, and means for securing said parts together.

18. In a water meter, a meter-wheel or propeller comprising a hollow body-cylinder of uniform diameter throughout its length and having externally thereon annular series of vanes and water-ways, each series surrounded by an attached cylindrical shell, and adapted for the in-feed of water at both ends of the wheel; in combination with upper and lower axle-bearing hubs each surrounded by a cone, the larger end of which approximately matches the end circle of the body cylinder, a bearing supporting annulus having an inwardly turned lip that approximately matches the circle of the surrounding cylindrical shell, and a meter-casing having upper and lower inflow compartments for supplying water to the respective ends of the wheel, and a central out-flow compartment surrounding the central part of said meter-wheel.

19. In a water meter of the class specified, the combination with an intermediate gearing-train, the meter-wheel, meter-wheel casing, and its upper bearing-hub in which said meter-wheel is journaled; of a supporter for the intermediate gearing-train, having means at its center for its attachment to the upper bearing hub of the meter-wheel casing.

20. In a water meter of the class specified, an intermediate gearing train, and a supporter therefor provided with a central screw-threaded boss; in combination with the meter-wheel bearing having a threaded end to which said boss is screwed for supporting said gear train independently of the main casing.

21. In a water meter of the class described, in combination with the meter-wheel comprising the wheel-body, its metal axis-shaft with projecting journals, and collar nuts confining said body on the axis-shaft, and the bearing hubs for said journals; of the hard rubber bearing, bushings provided with annular flanges at the ends adjacent to said nuts, said flanges interposed between the nuts and the ends of the bearing hubs, for the purpose set forth.

22. In a water meter of the character described, the combination with the peripherally discharging meter-wheel, of a cage therefor comprising upright side bars disposed at intervals about the wheel, said bars being provided with longitudinal radially projecting ribs or flanges 21 formed thereon, and adapted for interrupting circular flow of the discharged water around the wheel.

Witness my hand this 9th day of November 1908.

WILLIAM H. LARRABEE.

Witnesses:
CHAS. H. BURLEIGH,
A. G. DAVIS.